United States Patent Office 2,847,182
Patented Aug. 12, 1958

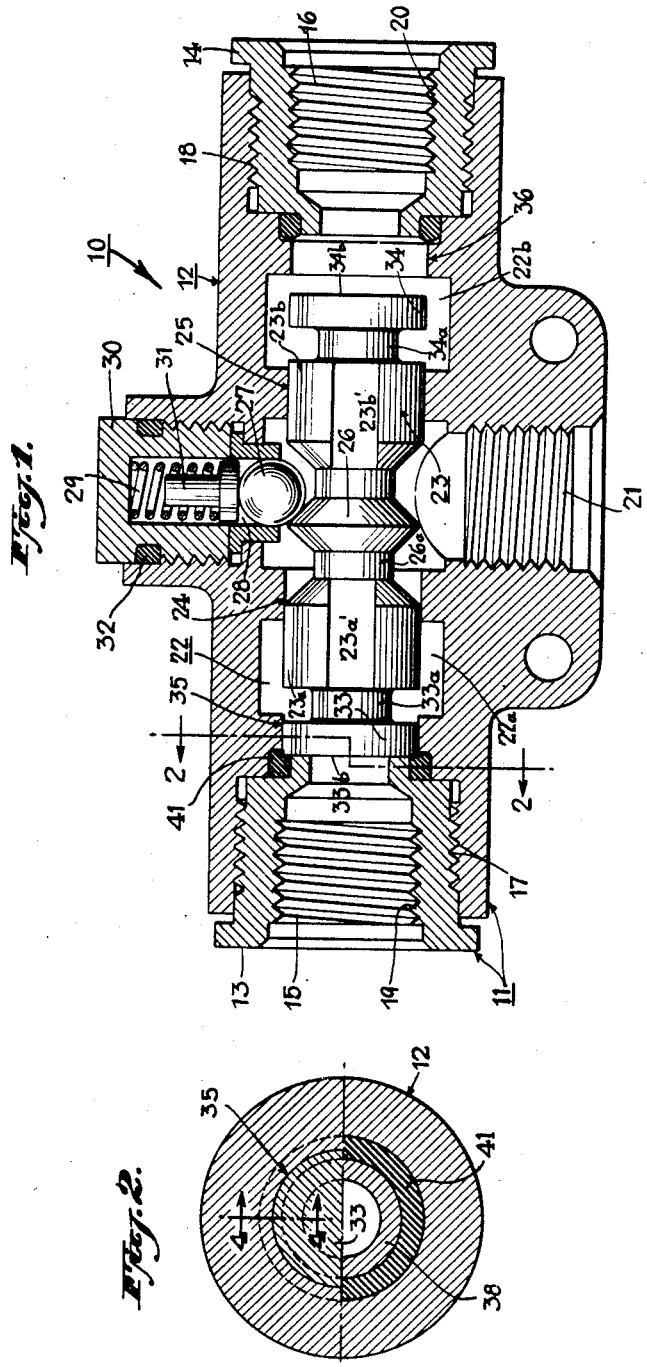

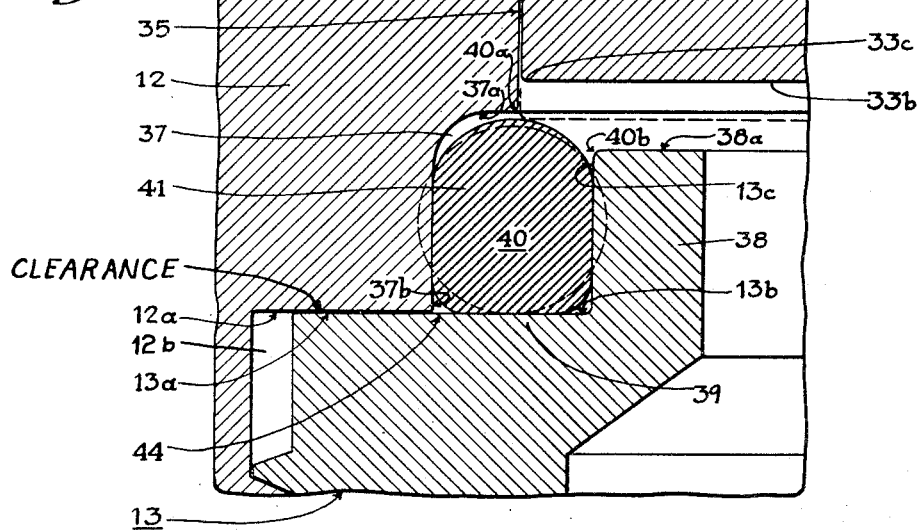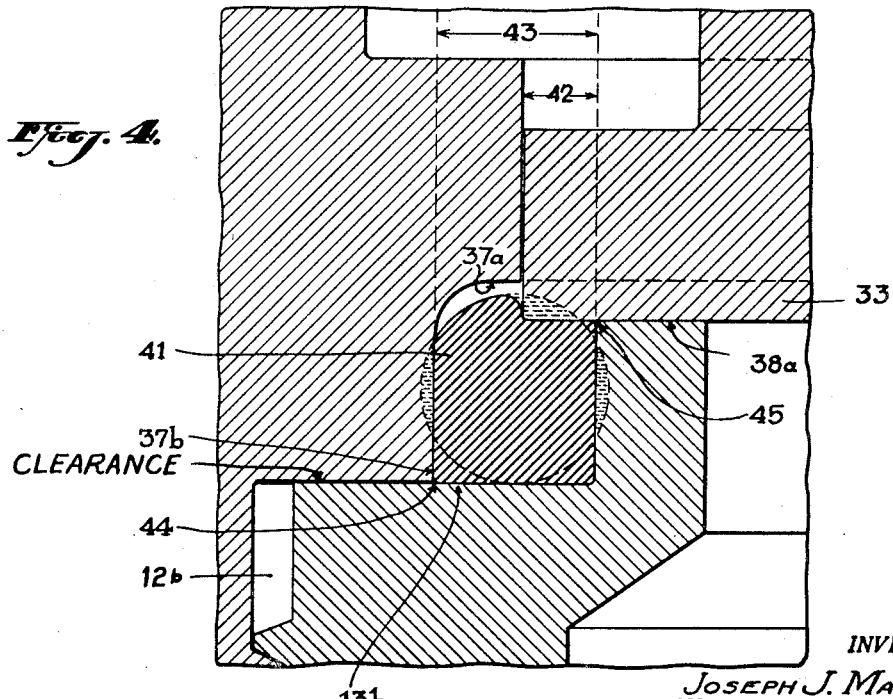

2,847,182

VALVE STRUCTURE

Joseph J. Mancusi, Jr., Eastchester, N. Y., assignor to Hydra-Power Corporation, New Rochelle, N. Y., a corporation of New York Application January 31, 1952, Serial No. 269,198

6 Claims. (Cl. 251—332)

This invention relates to valve structures, and more particularly to valve sealing means for preventing leakage at extremely high and low fluid pressures.

One of the objects of the present invention is to provide a novel valve sealing means for a high pressure fluid system wherein a tight leakproof valve closure is provided at both relatively low and extremely high fluid pressures.

Another object of the present invention is to provide a novel valve sealing means employing a deformable sealing element which is capable of successfully resisting extrusion when subjected to extreme fluid pressure, and which also is capable of successfully resisting so-called "washout" or forceful removal from its retaining means caused by extreme turbulence or high rate of fluid flow. Such extrusion has occurred in certain devices of this type heretofore suggested when the valve is near or has reached a closed position, and such washout has occurred in such prior devices when the valve is open.

A further object of the present invention is to eliminate the need for highly accurate lapping of a valve member and a seat therefor.

A still further object of the present invention is to provide a valve structure having sealing means of the above character which is simple and inexpensive to manufacture and which is well adapted for mass production techniques.

Another object of the invention is to provide a novel valve sealing means which is capable of withstanding leakage after being subjected to extreme operating conditions which normally produce severe aging effects.

The invention in one aspect thereof comprises a valve assembly having in combination a valve casing which is provided with a passage therethrough. A valve element also is provided which is axially movable in the passage and is provided with an annular portion for engaging a deformable annulus or sealing ring. Such annular portion, in the form shown, comprises an annular corner of the valve element formed by the periphery of such element and a flat out-face of such element. Such corner is sometimes referred to as a peripheral valve corner. Said deformable sealing ring is held within an annular chamber which is formed around such casing passage at one extremity of the path of movement of said valve element. The chamber has an annular mouth which opens into said passage and through which said peripheral valve corner can pass to engage and deform the sealing ring. Such annular chamber is formed by the outer or peripheral surfaces of a rigid ring (positioned in and coaxially of the casing passage) in cooperation with the surfaces of a recess formed in the surface of said casing passage. The rigid ring comprises a part of a sleeve member or end plug which is removably mounted upon said casing and which has a suitable passage therethrough in communication with the casing passage. A flat or plane annular surface of such rigid ring faces such valve out-face and acts as a limit-stop (or stop-face) for the motion of said valve element in one direction. Such stop-face is positioned to permit said peripheral valve corner to move into said annular chamber to engage said deformable sealing ring as aforementioned. The surface of said casing passage is also shaped to form a casing end face next to and outwardly of said recess as measured axially thereof, and such latter end face is designed for engaging a corresponding end face upon said sleeve member, such end faces being in close face-to-face engagement. A joint line is thus formed in such annular chamber where such end faces join. This line is referred to as a sleeve-casing joint line. In the form of the invention shown such line is at an outer corner of such annular chamber, which corner is referred to as a sleeve-casing corner, the latter being of annular shape. Said deformable sealing ring is interposed between the aforementioned annular mouth and said sleeve-casing corner whereby the sealing ring can be tightly thrust against or across said corner to seal same in response to pressure upon the sealing ring by the peripheral valve corner. One of the important characteristics of this invention is the location of such sleeve-casing joint line within such annular chamber at such a position that the deformable sealing ring is thrust thereover to seal same in response to fluid under pressure acting upon those areas of the sealing ring which are accessible to such fluid and/or to the deformation of the sealing ring by the peripheral valve corner of the valve element. Thus the sleeve-casing joint line is substantially removed from those areas of the sealing ring which are accessible to fluid under pressure and to such peripheral valve corner of the valve element. To accomplish this, the sleeve-casing joint line is positioned, as measured along the axis of movement of the valve element, axially outwardly of the mouth of the annular sealing ring chamber. Preferably such line should be at or near the bottom of such annular chamber. Also, the movement of the valve element into engagement with said stop-face forms a sleeve-valve joint line, for example at a sleeve-valve corner (or ring-valve corner) between said valve out-face and the peripheral surface of the rigid ring. This latter corner also will be sealed as a result of the engagement of said peripheral valve corner with such sealing ring. Fluid under pressure which acts to close said valve will tend tightly to seal both of said joint lines by its action upon those surfaces of the sealing ring which are exposed to such presure, namely, those surfaces located radially outwardly of such peripheral corner.

Various, further and more specific objects, features and advantages of the invention will clearly appear from the detailed description given below taken in connection with the accompanying drawings which form a part of this specification and illustrate, by way of example, a preferred arrangement of apparatus for carrying out the invention. The latter consists in such novel combinations of features as may be shown and described in connection with the device herein disclosed.

In the drawings:

Fig. 1 is a longitudinal sectional view, with parts broken way, illustrating a value assembly embodying one form of the invention;

Fig. 2 is a sectional view taken along line 2—2 of Fig. 1;

Fig. 3 is a fragmentary sectional view on an enlarged scale showing the details of the novel valve closure with the parts thereof in one position; and Fig. 4 is a view similar to Fig. 3 but with the parts thereof in a different position and taken substantially along line 4—4 of Fig. 2.

Referring to the drawings in greater detail, the novel valve seal is shown in Fig. 1 in connection with, for example, a shuttle valve indicated generally at 10 having a valve body indicated generally at 11 which body includes a valve casing 12 and so-called end plugs or sleeve members 13 and 14 each being provided with a passage therethrough, as at 15 and 16, respectively. The sleeve members 13 and 14 are secured at opposite ends of the valve casing 12 by means of threads, as at 17 and 18 respectively. If desired, the internal surfaces of the sleeve members 13 and 14 may be threaded, as at 19 and 20, respectively, to receive correspondingly threaded conduits.

The passages 15 and 16, respectively, constitute inlet ports for the passage of fluid to an outlet 21 via a valve casing passage generally indicated at 22. The outlet preferably is centrally disposed and can be supplied selectively from either of the inlets 15 or 16 depending upon the location of a shuttle valve element 23.

The shuttle valve element 23 is reciprocably mounted in the valve casing bore 22 by means of bearing portions 24 and 25 having cylindrical inner surfaces for embracing cylindrical portions 23a and 23b of the shuttle valve 23. The latter shuttle valve, in the absence of fluid under pressure, is urged toward either one or the other of its extreme positions by means of a spring detent device consisting of a rib 26 formed upon the shuttle valve element 23 intermediate the cylindrical portions 23a, 23b, and a detent ball 27 which is axially shiftable within a bore, as at 28, under the influence of a spring 29 which is held in operative position in the bore 28 by means of a closure cap 30 which is threadedly secured to casing 12 in a well known manner. The spring 29 exerts pressure upon the ball 27 through the intermediary of a spring pin 31. Suitable packing is provided, as at 32, to prevent leakage between the casing 12 and the closure cap 30. Other packing may be employed as desired. The rib 26 preferably is in the form of a pair of frusto-conical members having a common base.

Located outwardly of the cylindrical portions 23a and 23b are valve elements 33 and 34, respectively, which are preferably an integral part of the shuttle valve element 23 but which are interconnected thereto by relatively restricted portions, as at 33a and 34a. Said portions 33a and 34a may be equal in diameter to a central region of the shuttle valve, as at 26a, from which the rib 26 protrudes. The valves 33 and 34 are provided with flat outer end faces 33b and 34b, respectively, for cooperation with and acting as a part of the valve sealing means as will appear herebelow.

In view of the fact that the bearing portions 24 and 25 embrace the cylindrical shuttle valve portions 23a and 23b, it is necessary to form slots in the latter, as at 23a' and 23b', in order to permit fluid flow therepast. Any number of such slots may be formed.

Each of the valve elements 33 and 34 is preferably cylindrical in conformation and is movable to a position where it is embraced by its respective cylindrical passage portion (valve element chamber) as at 35 and 36, such portions being relatively of smaller diameter than adjacent enlarged so-called flow chambers 22a, 22b below described. The tolerance between the valve elements 33 and 34 and said portions 35 and 36 is relatively close and is adequate to permit piston-like movement of said elements therein.

In the form shown, the passage 22 is provided with said enlarged flow chambers 22a and 22b into which the valve elements 33 and 34 are respectively movable one at a time depending upon the axial position of the shuttle valve 23 as a whole. Movement of a valve element, as at 34 (Fig. 1), fully into its respective enlarged flow chamber 22b, of course, results in a full opening of the valve closure at the righthand side of the valve structure (Fig. 1) whereby fluid entering the inlet 16 may pass to the outlet 21 via said enlarged passage portion 22b and slot 23b'.

The novel valve sealing means will now be described in detail. Only one of the novel sealing means will be described as indicated on the lefthand portion of Fig. 1, it being understood that the sealing means on the righthand portion is identical. Referring to Figs. 3 and 4, the valve casing 12 is provided with the aforementioned relatively restricted cylindrical passage 35 which embraces the periphery of the valve element 33 and is separated therefrom by a preselected small tolerance adequate to permit axial piston-like movement of the valve element 33 in such passage. A recess 37 is formed internally of the valve casing next adjacent to said restricted cylindrical passage 35, such recess being in the form of an internal groove coaxial with the passage 35. The surfaces of the annular recess 37 form in cooperation with the outer surfaces of a removably mounted rigid ring 38 (part of sleeve 13) an annular chamber indicated generally at 40 for holding a deformable annulus 41, the latter being preferably of synthetic or natural rubber or some deformable rubber-like material. The annulus 41 is also referred to as a sealing ring or an O-ring and may be normally of circular transverse cross section when removed from the chamber 40.

The recess 37 and ring 38 form said annular chamber or groove 40 as follows in the form shown: Recess 37 is provided with an inner end face 37a and an outer side face 37b. Formed in the valve casing 12 outwardly of said recess 37 and next adjacent said outer side face 37b is a casing end face 12a designed for close but not fluid tight engagement with a sleeve end face 13a of the sleeve member 13. The sleeve member 13 (peripherally of the rigid ring 38 thereof) is provided with annular faces 13b and 13c which cooperate with faces 37a and 37b to form the annular chamber 40. Faces 13b and 13c may be considered as one continuous face. The face 13b may or may not be coplanar with the sleeve end face 13a. In order to provide a limit-stop for axial movement of the valve element 33, the rigid ring 38 is positioned in such a manner that its flat annular face 38a is in the path of the movement of said valve element and is conformed to engage outer valve face 33b in the manner well shown in Fig. 4. The recess 37 forms one of a pair of recesses in the passage of the valve casing, the other recess of such pair comprising the recess having an upper surface (as viewed in Fig. 3) comprising the aforementioned casing end face 12a. Such other recess is generally indicated in Fig. 3 as 12b.

The mouth of the annular chamber 40 is defined by annular lips 40a and 40b, the former being formed by the intersection of the face 37a with the surface of passage 35 and the latter by the intersection of the stop-face 38a and said annular face 13c. The width of such mouth, that is, the distance between the lips 40a, 40b, is so selected that it is impossible for the annulus 41 to be "washed out" of the chamber 40 in response to extreme turbulence or high flow in the passage 22 when the valve is opening or is fully open. Nor is it possible for a so-called wire drawing or extrusion effect to dislocate or damage the O-ring 41 while the valve is progressively closing or opening and after it is closed or open. For example, the width of said mouth, as in the form shown, is approximately one-half of the diameter of the cross section of the O-ring 41.

The narrow width of the annular mouth of said annular chamber 40, together with the conformation of such chamber and a fluid leakage path between faces 12a, 13a, will prevent extrusion due to so-called wire drawing effect upon the deformable O-ring at such mouth when the valve is moved from an open to a closed position and vice-versa, the danger of such wire drawing effect normally arising during the progressive closure of the valve. The danger of "washing out" of the O-ring exists not only when the valve is undergoing closing but also when it is undergoing opening and is open, for example, as in the righthand portion of Fig. 1, at which time extremely high fluid flow and turbulence tends to have this effect. However this danger is overcome by this invention.

As aforementioned, the cross section of the O-ring 41 is preferably normally circular and is somewhat greater in diameter than the width of the annular chamber 40, as is well shown in Figs. 3 and 4, wherein the normal circular cross section of such ring is shown by a broken line. The deformable O-ring 40 preferably is initially positioned surrounding the rigid ring 38 and thereafter the latter is positioned, as shown in Fig. 3, whereby the deformable O-ring is squeezed into the annular chamber 40 and undergoes the deformation shown in this figure wherein such annular chamber is substantially filled by the O-ring with the top portion of the latter, as viewed in Fig. 3, extending above the level of the stop-face 38a whereby an outer peripheral corner 33c of the valve element 33 (peripheral valve corner) can engage same as will appear below.

Referring to Fig. 4, it has been found desirable to select the dimension 42 (radial width of mouth) substantially less than the dimension 43 (radial width of annular chamber 40), and in this embodiment dimension 42 is less than one-half of dimension 43. Such selection of dimensions will: (a) prevent the above-mentioned "washout" of the O-ring 41 as a result of high velocity fluid flow past such ring; (b) provide sufficient shielding to the O-ring to prevent extrusion of any part thereof during opening or closing of the valve.

Thus the stop-face 38a may be located below the face 37a and, of course, as aforementioned below the top surface of the O-ring 41 (as viewed in Figs. 3 and 4) a sufficient distance to insure that the valve element 33 will engage and be permitted to thrust downwardly on the O-ring in such a manner that it will deform substantially as shown in Fig. 4, thereby being urged and crowded down into the annular chamber 40 into sealing relation with the sleeve-casing joint line and the sleeve-valve joint line. However, the invention is not limited to such relative location of face 37a. Said sleeve-casing joint line (or ring-casing joint line) is indicated at 44 and, in the embodiment shown is formed along the intersection of surfaces 13b and 37b (a corner), and the sleeve-valve joint line is indicated at 45 and in the embodiment shown is formed along the intersection of surfaces 13c and 33b (a corner). Also a tight seal is formed between the valve element 33 and the O-ring 41.

The sleeve-casing joint line 44 is located at a region of the annular chamber 40 which has a substantial portion of said deformable O-ring 41 interposed between it and those areas of such O-ring which are accessible to fluid under pressure and/or to the valve element 33. This is accomplished by positioning such joint line 44 axially removed from such pressure accessible areas of the O-ring but towards the bottom of such annular chamber 40 (viz. measured along the longitudinal axis of the valve passage). In the embodiment shown, line 44 is actually on the bottom of the annular chamber 40.

Referring to Fig. 1, the righthand side of the valve is open and the lefthand side is closed. The valve element 34 consequently is positioned to the left of the cylindrical passage 36 and is in the relatively enlarged flow chamber 22b, fluid thus being permitted to flow through the passage 16, the cylindrical passage 36, the flow chamber 22b, the slot 23b' and thence to the outlet 21. When the valve element 34 is shifted to the right to close the valve opening 16 it will be seen that fluid flow from the left side thereof will be substantially entirely stopped by virtue of the movement of the element 34 into the relatively restricted cylindrical passage 36 although it is possible for a relatively small volume of fluid to flow in the passage between the periphery of element 34 and such closely surrounding passage 36. Nevertheless the bulk of the flow is shut off from such left side of the valve element 34 before such element approaches closely to its seated or sealing position in engagement with its O-ring. The same, of course, is true with respect to valve element 33 when it moves from the flow chamber 22a to the left, as viewed in Fig. 1.

In operation, the sequence of events when a valve element 33 (Fig. 3) shifts axially from the enlarged flow chamber 22a to the left into the relatively restricted cylindrical passage 35 is as follows: The bulk of the fluid flow from the high pressure side of the element is shut off by the entrance of the valve element into said passage 35. The element thereafter shifts downwardly, as viewed in Fig. 3, for example, from the position shown in solid lines to that shown in broken lines whereby the first contact is made between the valve element 33 and the top region of the O-ring 41. Such engagement of the valve and the O-ring is adequate immediately to prevent leakage of fluid between the valve element and the sealing ring. Such initial seal is assisted by the force of the above-described detent mechanism which urges the valve element 33 downwardly by means of the spring 29, the ball 27 and the rib 26. As the valve element 33 progresses downwardly it effects a deformation of the O-ring and simultaneously reduces the orifice through which the latter ring might possibly be extruded. The pressure required to deform the sealing ring to the extent shown in Fig. 4 when valve element 33 is in engagement with stop-face 38a, is relatively substantially lower than the maximum pressure which the valve seal is capable of withstanding, that is, the valve closure is capable of withstanding pressures greatly in excess of the pressure required to deform the annulus 41 to the extent necessary to seal said sleeve-casing joint line 44 and the sleeve-valve joint line 45.

There is thus provided a novel valve structure having a deformable sealing ring which is so disposed that it can successfully resist extrusion or wire drawing effect and also can successfully resist the tendency to thrust same out of the mounting therefor due to extreme turbulence and/or extreme fluid pressure. The novel valve means are extremely simple in construction, are easily adapted to mass production techniques and provide positive means for preventing fluid leakage at extraordinarily high fluid pressures.

Although only one embodiment of the present invention has been illustrated and described in detail, it is to be expressly understood that the invention is not limited thereto. For example, instead of employing the valve sealing means as shown herein with the shuttle valve, the novel structures can be employed as well with other forms of valves, such as relief valves, check valves, poppet valves, globe or needle valves.

Various changes may be made in the design and arrangement of the parts without departing from the spirit and scope of the invention as the same will now be understood by those skilled in the art. For a definition of the limits of the invention, reference will be had primarily to the appended claims.

What is claimed is:

1. In a valve assembly, a valve casing having a passage therein and a pair of adjacent recesses formed internally of said casing in the surface of the passage, one of said recesses having a casing end face; a valve element movably mounted in such passage; a rigid sleeve member mounted in the passage adjacent such recesses and having a peripheral surface for forming an annular chamber with the surfaces of one of the recesses, and also having a surface closely positioned to said casing end face to form a sleeve casing joint line, the latter line being positioned in such annular chamber and defining the inner boundary of a relatively close joint between such surfaces, such joint having a fluid leakage path therethrough which is in communication with the atmosphere at all times via passage means in such valve assembly, such chamber having an annular mouth opening into the passage, said sleeve member being positioned in the path of said valve element and acting as a limit-stop therefor, an annular portion of said valve element being positioned for entering said mouth in response to movement of said valve element into engagement with said rigid sleeve member; and a sealing ring of deformable material mounted in and substantially filling said annular chamber, said sealing ring being pressable by said annular portion of said valve element inwrdly of said chamber against and into sealing relation with said sleeve-casing joint line, the latter as aforementioned being in communication with the atmosphere via a passage in said valve assembly whereby a region in the neighborhood of such joint line is at a relatively low pressure as compared to the pressures acting upon the substantially opposite surfaces of said sealing ring, such sleeve-casing joint line being positioned in such annular chamber at a region axially spaced from those areas of the sealing ring which are engaged by said valve element, such axial spacing being towards the bottom of such annular chamber.

2. In a valve assembly, a valve casing having a passage therein and an annular recess formed internally of said casing in the surfaces of the passage; a valve element movable axially of said casing and in the passage and having an outer valve face; a rigid ring member mounted upon said casing in the passage adjacent the recess and having an outer surface for forming an annular chamber in cooperation with the surface of such recess, portions of such outer surface forming a ring-casing joint line with such recess surface, said ring member having an annular surface for engaging said outer valve face and acting as a limit-stop therefor, such annular surface and outer valve face forming a ring-valve joint line when they are in engagement, such annular chamber having an annular mouth opening into the casing passage; and a sealing annulus of deformable material positioned in and substantially filling the annular chamber and interposed between the annular mouth thereof and such ring-casing joint line; said valve element having an annular portion for entering said mouth, pressing against said sealing annulus and thrusting same into sealing relation with said joint lines, said ring-casing joint line being spaced axially from those areas of said sealing annulus which are accessible to fluid under pressure, such spacing being measured from such areas towards the bottom of such chamber, said ring-casing joint line defining the inner boundary of a relatively close joint between such outer surface and such recess surface, said joint defining a fluid leakage path in communication with the atmosphere via a passage in said valve assembly.

3. In a valve assembly, a valve casing having a passage therein and a recess formed internally of said casing in the surface of the passage; a valve element movable within and axially of the passage and having an outer valve face; a rigid ring member removably mounted upon said casing in the passage adjacent such recess and having an outer surface for forming an annular chamber in cooperation with the surface of the recess, portions of said ring outer surface forming a ring-casing corner surface with such recess surface, said ring-casing corner surface containing a ring-casing joint line defining the boundary of the juncture of such ring outer surface and such recess surface, which interengaging surfaces at such juncture have a substantially close fit and define the mouth of a fluid leakage path, the latter being in communication with the atmosphere via passage means in such valve assembly, a portion of such passage means being formed between said ring member and valve casing, said ring member having an annular surface positioned in the path of movement of said valve element for engaging said outer valve face and acting as a limit-stop for such valve element, such annular surface and outer valve face forming a ring-valve corner surface in response to the engagement of such surface and face, such annular chamber having an annular mouth opening into the casing passage, and a sealing annulus of deformable material positioned in the annular chamber substantially filling same and interposed between the annular mouth thereof and such ring-casing corner surface; and said valve element having an annular portion for entering said mouth, pressing against said sealing annulus and thrusting the latter into sealing relationship with said ring-casing and ring-valve corner surfaces, said ring-casing corner being axially removed (towards the bottom of such annular chamber) from the areas of such sealing annulus which are accessible to fluid under pressure.

4. In a valve assembly, the combination comprising: a valve casing having a passage therethrough, there being an annular recess formed in such casing and surrounding such passage, such annular recess having an annular mouth; a valve element axially movable in said passage, said element having an outer face forming with the sides thereof an outer peripheral valve corner; a removable sleeve member mounted upon said casing and having a passage therethrough in communication with the aforementioned casing passage, said sleeve member having integral therewith a rigid ring member positioned in such casing passage in axial alignment therewith, said ring member having a stop-face for engaging said valve element and acting as a limit-stop for the axial movement thereof in one direction, said ring member being located for cooperating with the aforementioned recess to form an annular chamber at one extremity of the path of axial movement of said valve element, said chamber having an annular mouth, the stop-face of said ring member being positioned to permit the peripheral valve corner of said valve element to move into such annular chamber in response to movement of said valve element into engagement with such stop-face; said ring member and valve casing having surfaces for engaging one another thereby to form along the inner boundary of such engaging surfaces a ring-casing joint line which is located in the aforementioned annular chamber at a region substantially opposite to such annular mouth of such chamber, said engaging surfaces of said ring member and valve casing comprising a substantially close joint, the latter defining a fluid leakage path between such surfaces which is in communication with the atmosphere via a passage in such valve assembly; and a sealing annulus of deformable rubber-like material positioned in the annular chamber and substantially filling same, portions of said annulus being positioned at such mouth of said chamber for engagement by such peripheral corner, the radial width of such mouth of such chamber being less than one-half the radial width of such annular chamber, in operation there being a substantial pressure differential on opposite sides of such sealing annulus due to pressure differential at the mouth of said annular chamber and the areas of such annulus in the region of said ring-casing joint line.

5. In a valve structure, a valve casing having a flow chamber and a valve element chamber; a valve element axially movable in said chambers, said flow chamber being substantially larger than said element to permit flow through said chambers when said element is positioned therein, said valve element chamber being formed to embrace said valve element throughout the periphery of the latter within relatively close tolerances for piston-like movement therein; said casing having an annular recess formed in the passage therethrough adjacent said valve element chamber and also having an end face formed adjacent said recess; a sleeve member mounted on said casing and having a passage therethrough, said sleeve member having a ring formed integral therewith for cooperating with the aforementioned annular recess for forming an annular chamber and also having a sleeve end face for engaging said first-mentioned end face to form a sleeve-casing joint line, said sleeve end face and said casing end face being in substantially close engagement forming a substantially close joint, the latter defining a fluid leakage path between such surfaces which path is in communication with the atmosphere via a passage in said valve structure, said annular ring having a surface for acting as a limit-stop for the axial motion of said valve element toward a seated position; and a sealing annulus of deformable material positioned in said annular chamber and substantially filling same, said sleeve casing joint line being positioned near the bottom of such annular chamber whereby it is axially removed from those areas of the sealing annulus which are in contact with fluid under pressure, in operation there being a substantial pressure differential between those areas of the sealing annulus which are in contact with fluid under pressure in the valve assembly and those areas of such annulus in the region of the aforementioned sleeve-casing joint line.

6. In a valve assembly, a valve casing having a cylindrical passage therethrough and an annular recess formed in such casing coaxially with such passage, said casing also having an end face formed in said passage next to said recess; a cylindrical valve element axially movable in said passage and having an outer diameter which is less than the inner diameter of said cylindrical passage by a relatively small clearance adequate to allow piston-like movement only of said valve element, the latter element having an outer face forming with the cylindrical sides of said element an outer peripheral corner; a sleeeve member removably mounted upon said valve casing and having a passage therethrough in communication with the aforementioned casing passage, said sleeve member having an end face in engagement with the end face of said valve casing, said sleeve member and valve casing end faces being in substantially close engagement forming a substantially close joint, the latter defining a fluid leakage path between such end faces which path is in communication with the atmosphere via passage means in such valve assembly, the inner boundary of such engaging end faces being defined by a sleeve-casing joint line, said sleeve member also having a ring member integral therewith and positioned coaxially of such passage, ring member having a stop-face for engaging such valve element and acting as a limit-stop for the axial movement thereof in one direction, said ring member being located for cooperating with the aforementioned recess to form an annular chamber at the outer extremity of the path of axial movement of said valve element, such annular chamber having an annular mouth in communication with the first-mentioned passage, said stop-face being positioned to allow the peripheral corner of said valve element to enter the mouth of said annular chamber in response to movement of said valve element into engagement with said stop-face; and a sealing ring of deformable material positioned in the aforementioned annular chamber substantially filling same with portions thereof positioned at such mouth for engagement by such peripheral corner, said sleeve-casing joint line being positioned in such annular chamber at a region axially spaced towards the bottom thereof away from those areas of the sealing ring which are directly contacted by fluid under pressure in the assembly whereby in operation said sealing ring is thrust into sealing engagement with such joint line by fluid under pressure, and in operation is held in position under the influence of a pressure differential existing between those areas of the sealing ring in the region of said sleeve-casing joint line and those areas of the sealing ring which are acted upon by such fluid under pressure.

References Cited in the file of this patent

UNITED STATES PATENTS

| | | |
|---|---|---|
| 565,682 | Jenkins | Aug. 11, 1896 |
| 763,208 | Robinson | June 21, 1904 |
| 937,221 | Bashlin | Oct. 19, 1909 |
| 1,157,196 | Von Philp | Oct. 19, 1915 |
| 1,608,424 | Putnam | Nov. 23, 1926 |
| 2,431,437 | Van Der Werff | Nov. 25, 1947 |
| 2,524,951 | Ashton | Oct. 10, 1950 |
| 2,583,539 | Bashark | Jan. 29, 1952 |
| 2,621,011 | Smith | Dec. 9, 1952 |
| 2,703,584 | Mix | Mar. 8, 1955 |
| 2,722,402 | Crookston | Nov. 1, 1955 |